United States Patent [19]

Williams et al.

[11] 4,352,704
[45] Oct. 5, 1982

[54] METHOD OF MAKING POROUS TREAD

[75] Inventors: Arthur R. Williams, Birmingham; Gareth T. Williams, Lichfield, both of England

[73] Assignee: Dunlop Limited, London, England

[21] Appl. No.: 271,964

[22] Filed: Jun. 9, 1981

Related U.S. Application Data

[62] Division of Ser. No. 127,655, Mar. 6, 1980, Pat. No. 4,290,470.

[30] Foreign Application Priority Data

Mar. 16, 1979 [GB] United Kingdom ............... 7909376

[51] Int. Cl.³ ..................... B29G 7/02; B60C 11/00
[52] U.S. Cl. ........................... 156/125; 156/128 R; 264/109; 264/123
[58] Field of Search ............... 152/209 R, 330 R; 264/109, 123; 156/125, 128 R, 128 P, 128 T

[56] References Cited

U.S. PATENT DOCUMENTS

| | | | |
|---|---|---|---|
| 1,896,574 | 2/1933 | Covey | 152/209 R |
| 1,930,585 | 10/1933 | Covey | 152/209 R |
| 2,130,524 | 9/1938 | Clark | 152/209 R |
| 2,672,910 | 3/1954 | Corson | 152/209 R |
| 3,274,322 | 9/1966 | Seudder | 156/128 P |
| 3,850,875 | 11/1974 | Robson | 156/128 T |
| 3,856,067 | 12/1974 | Gorter | 152/209 R |
| 3,920,604 | 11/1975 | Berg et al. | 152/330 R |
| 4,176,702 | 12/1979 | Seilbarling | 152/209 R |

FOREIGN PATENT DOCUMENTS

| | | |
|---|---|---|
| 546975 | 8/1942 | United Kingdom . |
| 751641 | 7/1956 | United Kingdom . |
| 1132352 | 10/1968 | United Kingdom . |
| 1222964 | 2/1971 | United Kingdom . |
| 1250757 | 10/1971 | United Kingdom . |
| 1297627 | 11/1972 | United Kingdom . |

OTHER PUBLICATIONS

PCT International Application WO80/00233, 1980.

*Primary Examiner*—Michael W. Ball
*Attorney, Agent, or Firm*—Stevens, Davis, Miller & Mosher

[57] ABSTRACT

An unpatterned (grooveless) porous tire tread and a pneumatic tire incorporating the porous tread, together with methods of manufacturing the tire tread as a separate item and as an integral part of the tire are described. The tire tread has numerous randomly orientated and randomly distributed interconnected passages extending from the surface substantially throughout the tread. These passages provide water drainage paths preventing build-up of water between the tire tread and a wet road.

The tire tread is preferably manufactured by bonding particulated elastomeric material with a binder mixture that forms a polymer upon curing. Whether formed separately or integrally with a tire, the tread mould is unpatterned.

17 Claims, 6 Drawing Figures

METHOD OF MAKING POROUS TREAD

This is a division of application Ser. No. 127,655 filed Mar. 6, 1980, now U.S. Pat. No. 4,290,470.

This invention relates to tires, and more particularly to tire treads and pneumatic tires, and to the manufacture thereof.

Tire treads may be moulded and cured integrally with a tire carcass to form a complete tire, or treads may be formed separately from the carcass for subsequent bonding thereto to form a complete tire. A separately formed tread may take the form of a tread strip of a length at least equal to the circumference of the tire into which it is to be incorporated, the ends of the tread strip being joined when the tread strip is located on the carcass during building of the tire. Separately formed treads may be applied to new carcasses, or to the carcasses of used tires from which the original tread has been removed.

Conventonal tire treads have a complex and precisely designed pattern of ribs and blocks to provide a network of surface grooves with the object of allowing a conventional tire to operate on a wet paved surface without undue build-up of water between the tread and the paved surface. Such a build-up of water can seriously diminish the adhesion of the tire to the paved surface and thus cause a dangerous reduction of braking and steering capabilities. These conventional tire treads require intricate and expensive moulds to form the tread pattern.

The present invention proposes a novel form of tire tread and a pneumatic tire incorporating the novel tread (together with methods of manufacturing the tread and the tire) which has an alternative approach to maintaining good adhesion on wet paved surface, and which obviates the requirement for intricately patterned moulds with consequent economic advantages.

According to a first aspect of the invention there is provided a tire tread of elastomeric material formed to provide randomly distributed and randomly orientated interconnected passages extending from the tread surface substantially throughout the tread.

The void content of the tread (as hereinafter defined) may be in the range from 10% to 60%, and more preferably in the range from 25% to 40%. Said interconnected passages constitute voids in the tread, and the total volume of said voids expressed as a fraction of the overall volume of the tread is, in this description, called the "void content" of the tread. The volume of elastomeric material between and defining the interconnected passages expressed as a fraction of the overall volume of the tread is, in this description, called the "solid content" of the tread. From the fore-going definitions, it will be seen that "void content" plus "solid content" equals the overall volume of the tread. Therefore if the void content is x%, then it follows that the solid content must be $(100-x)\%$.

In said tire tread, the average cross-sectional area of the passages may be large or small relative to the cross-sectional area of adjacent tread material between and defining the passages. In the latter case (i.e. relatively small passages), the tread may be termed a porous tread.

In said tire tread, the void content may be substantially uniformly distributed throughout the tread. Alternatively, the void content may vary between different regions of the tread substantially according to a predetermined void distribution pattern. As examples of void distribution patterns within the scope of the invention, the pattern may be such that the void content decreases or increases with increasing distance radially inwardly from the tread surface which will contact a road when the tread is part of a tire; and alternatively or additionally the pattern may be such that the void content decreases or increases with increasing distance laterally inwardly from the lateral edges of the tread. Other void distribution patterns are possible within the scope of the invention.

The tire tread may comprise numerous discrete regularly shaped or preferably irregularly shaped particles of an elastomeric material which is preferably of the type employed as tread stock in conventional tires and which may be material obtained from scrap tires or scrap tread stock. Said particles may have a substantially uniform size, or they may have at least two different sizes. The particles may have a volumetric size or sizes in the range from $6.5 \times 10^{-5}$ cc to 15 cc., and more preferably in the range from $5 \times 10^{-4}$ cc. to $4 \times 10^{-2}$ cc. The particles may have a hardness or a range of hardnesses in the range 30 to 85 Shore A. Particles of selected different sizes and/or hardnesses may be distributed within the tread substantially according to a predetermined particle distribution pattern.

Preferably said particles are mutually bonded into a cohesive mass. Said particles may be bonded by interparticle fusion, and in the case where said particles are of uncured rubber, said interparticle fusion may comprise cross-linking the material of adjacent particles at their points of mutual contact. Alternatively, said particles may be mutually bonded into a cohesive mass by a binder matrix which may be a thermo-setting material, or composed of a binder material which solidifies upon curing to form the binder matrix with the particles thereby bound together. The binder material may be a thermo-setting resin, or a reaction mixture which forms a polymer upon being cured, and the polymer may be polyurethane, polyurea, polyamide, polybutadiene, or polypropylene.

Preferably the surface of the tread which will contact a paved surface when the tread is part of a tire, is devoid of any regular pattern of blocks, ribs, slots or grooves.

According to a second aspect of the invention there is provided a pneumatic tire comprising a carcass, and a tire tread according to the first aspect of the invention. The tire may be a radial tire incorporating a tread-reinforcing breaker disposed between the carcass and the tread, or the tire may be a cross-ply tire, or the tire may be a belted-bias tire incorporating a tread-reinforcing breaker disposed between the carcass and the tread.

According to a third aspect of the invention there is provided a method of manufacturing a tire tread according to the first aspect of the invention, comprising the steps of binding and shaping particulated elastomeric material to the required shape of the tread. Said particles may be bound by the step of interparticle fusion, and in the case where said particles are of uncured rubber, said fusion may comprise cross-linking the material of adjacent particles at their points of mutual contact. Alternatively said particles may be mutually bound by the step of forming a mixture of said particles with a binder material. The shaped mixture may be at least partly cured to form a cohesive mass. The shaping process may be performed by the step of extruding the mixture through a die whose orifice is shaped to the required cross-sectional shape of the tread, and the extruded tread may be cured immediately it leaves the die. The extruded tread may be severed into discrete lengths substantially equal to the circumference of a tire into which the tread is to be incorporated. Alternatively, the shaping process may be performed by the step of placing the mixture in a mould having the shape and dimensions of a desired strip of tread, followed by the step of at least partly curing the mixture in said mould, and finally removing the tread strip from the mould. The mould may be annular such as to produce a tread band in the form of a jointless loop of tread.

The method of manufacturing the tire tread may include the step of forming said particles by a particulation process which may be granulation of rubber sheet or block, which may be subjected to cryogenic freezing to facilitate granulation, or by rasping scrap tire treads. When the material is particulated, it may be sieved to select particles of relatively uniform sizes from relatively non-uniformly sized particles produced by the particulation process.

According to a fourth aspect of the invention there is provided a method of manufacturing a tire according to the second aspect of the invention, comprising the steps of forming the tire tread by the method of the third aspect of the invention, applying the tire tread to the tire carcass, and consolidating the assembly of the tread and the carcass. The tread may be extruded onto the carcass, the assembly placed in a mould, heat and pressure applied to cure the assembly in the mould, and the tire removed from the mould when the tire is substantially completely cured. Alternatively, the carcass may be placed in a mould, a mixture of elastomeric particles and a binder material injected into the mould around the carcass, heat and pressure applied to cure the assembly in the mould, and the tire removed from the mould when the tire is substantially completely cured. As a further alternative, the tread may be pre-formed as a tread strip or a tread band, and the pre-formed tread bonded to the carcass. The bonding of the tread to the carcass may be performed by use of an adhesive. The tire carcass and the tire tread bonded thereto may be cured by being placed in an unpatterned mould followed by the application of heat and pressure.

In the manufacture of a tire according to this fourth aspect of the present invention, the tire carcass may initially be at least partly precured and additionally or alternatively the tire tread may initially be substantially uncured. The tire carcass may be the carcass of a used tire from which the original tread has been removed.

The principles by which mineral particle sizes may be chosen to provide a given void content have been described in connection with "Delugrip" (Registered trade mark) road surface materials which comprise mineral particles of graded sizes embedded in an asphaltic binder. It is considered that the same principles are applicable to the manufacture of a tire tread in accordance with the present invention. These principles have been detailed in the technical article entitled "The Rational Design of Aggregate Gradings for Dense Asphaltic Compositions" by G. Lees, published in "Proceedings of the Association of Asphalt Paving Technologists Conference", Kansas City, United States of America, February 1970. This article describes an approach to the control of void content with respect to the grading and physical properties of the particles.

The tire treads and tires of the present invention may be for any size and use of vehicle, for example motorcycles, cars, light and heavy vans, trucks, buses, coaches, and aircraft.

Embodiments of the invention will now be described by way of examples, with reference to the accompanying drawings wherein.

Figure 3:
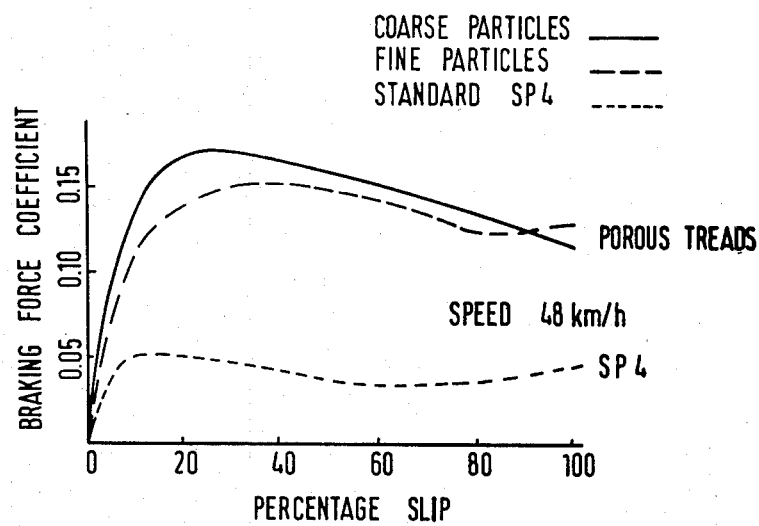
Figure 4:
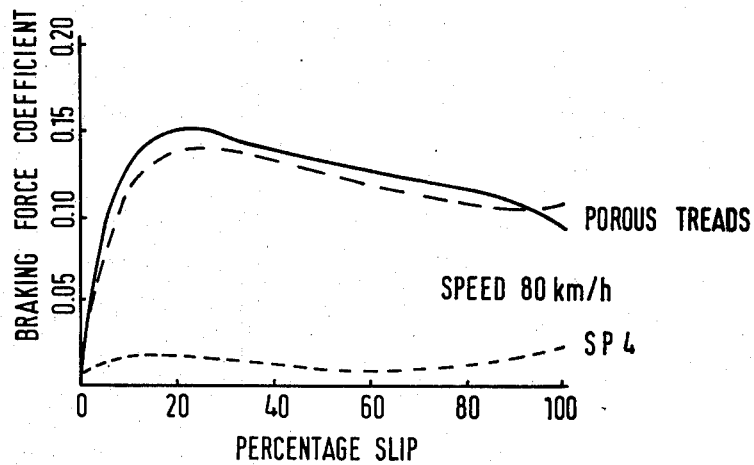
Figure 5:
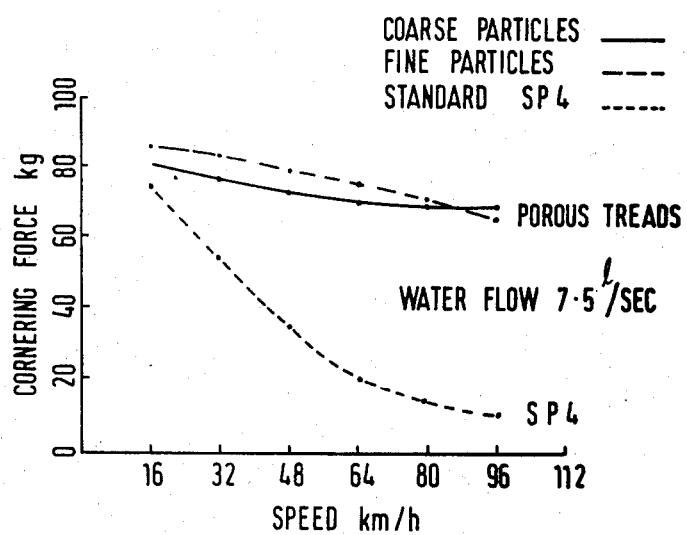
Figure 6:
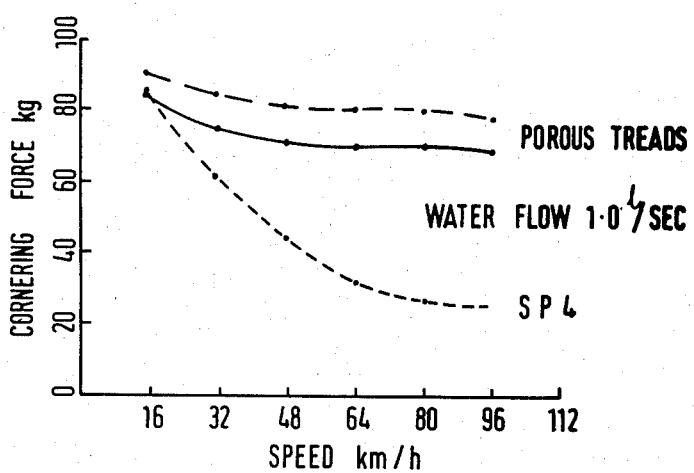

FIGS. 3 and 4 are graphs of the braking performance at two different speeds on a wet test surface of two tires in accordance with the invention, and of a standard tire for comparison; and FIGS. 5 and 6 are graphs of the cornering performance on a test surface at two different water depths, of the three tires compared in FIGS. 3 and 4.

Figure 1:
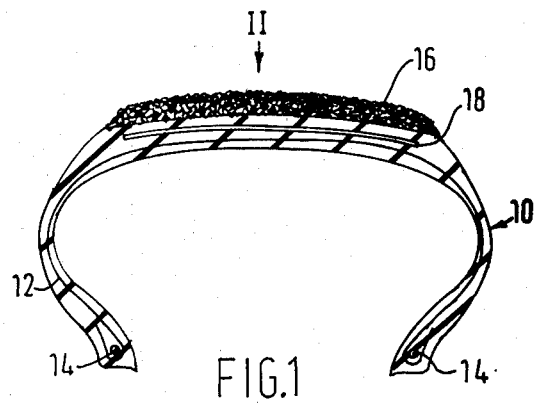
FIG. 1 is a cross-section of a tire in accordance with the invention, taken in a plane including the axis of the tire.
Figure 2:
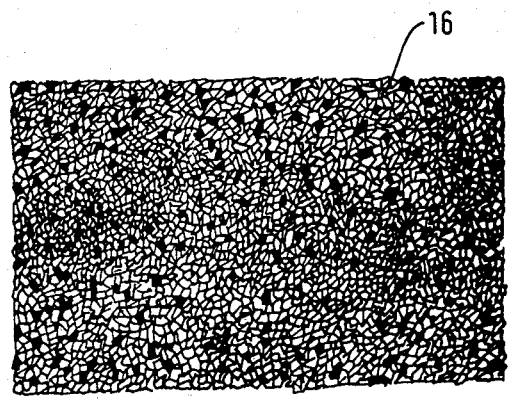
FIG. 2 is a plan view to an enlarged scale, of a portion of the tread of the tire of FIG. 1, as viewed in the direction of the arrow II in FIG. 1.

Referring first to FIG. 1, this illustrates the cross-section of a tire 10 in accordance with the invention, the section being taken in a plane including the rolling axis of the tire 10. By way of example, the tire 10 is a radial tire having a reinforcing ply 12 of cords aligned substantially at 90° to the circumferential direction of the tire, the ends of the ply 12 being turned-up around two bead cores 14. The tire 10 also includes a tread 16 and a tread-reinforcing breaker 18 as is known in the tire art. In a normal tire, the tread 16 would be an intricately grooved layer of otherwise solid rubber moulded integral with the remainder of the tire. However, in accordance with the invention, the tread 16 is formed as a porous layer of elastomeric material providing randomly interconnected and randomly orientated passages extending from the surface of the tread 16 substantially throughout the tread. (The tire 10 could be other than a radial tire, for example a cross-ply tire, or a belted-bias tire).

Some Examples of methods of forming the tread 16 and tires incorporating such treads will now be given.

The tire tread of the present invention may be incorporated into a tire either by a retreading process (i.e. bonded onto a used carcass) or as part of a tire building process.

EXAMPLE 1

One way to make a tire according to the present invention is to:

(i) prepare a tread strip according to the present invention;

(ii) attach to the tread strip, by means of the binder used to create it, an uncured rubber-based undertread layer;

(iii) rasp a vulcanized tire casing and coat it with a standard heat curable tread solution;

(iv) apply the tread strip/undertread to the solutioned casing and join the ends with the same tread solution; and (v) cure the assembly in a plain tread mould, (i.e. a patternless mould).

EXAMPLE 2

A tread strip was made by casting an intimate mixture of the following components into a wooden mould of the required dimensions:

| | Parts |
|---|---|
| Granulated whole tire scrap consisting vulcanized rubber particles of irregular shapes and assorted sizes | |

| | Parts |
|---|---|
| up to 0.5 cc<br>Granulated whole tire scrap consisting<br>of vulcanised rubber particles of<br>irregular shapes and graded to 10 B.S.<br>mesh (i.e. British Standard sieve<br>number 10) | 500 |
| Hydroxyl-tipped liquid polybutadiene of<br>molecular weight 2800 (R45M ex. Arco) | 1000<br>360 |
| Liquid form of methylele-bis-aniline<br>diisocyanate containing higher<br>functionality isocyanates (Suprasec<br>DND ex I.C.I.) | 140 |
| Carbon black pigment dispersion | 5 |
| Stannous octoate | 0.2 |

After 24 hours the mixture had cured to a non-tacky composite.

A tire carcass was then prepared by rasping the tread from a car tire, and the crown of the carcass was coated with a room-temperature curable adhesive composition of R45M (10 parts), Suprasec DND (4 parts) and stannous octoate (0.01 part). The tire tread strip was then applied to the carcass and bandaged to the carcass with tape, the strip ends being joined by means of the same adhesive composition. An inner-tube was inflated within the carcass to help achieve intimate contact between the carcass and the tread strip. After 48 hours the bandage was removed and the inner-tube deflated, leaving a completed tire.

EXAMPLE 3

(Use of Alternative Binder)

An intimate mixture of the following components was cast into a mould of the required dimensions:

| | |
|---|---|
| Granulated vulcanized rubber, the particles being of<br>generally uniform size having a mean<br>diameter of 0.5 cm and 65 Shore A hardness | 100 pbw |
| Adiprene L-167 (an isocyanate-functional<br>polyurethane prepolymer ex Du Pont) | 19 pbw |
| Caytur 21 (a diamine curative ex Du Pont) | 6 pbw |
| Carbon black pigment dispersion | 2 pbw |
| The product, in the form of a tread strip,<br>resulted after the mould had been heated to<br>120° C. for one hour. | |

EXAMPLE 4

(A Further Alternative Binder)

An intimate mixture of the following components was cast into a mould of the required dimensions:

| | |
|---|---|
| Granulated vulcanized rubber, as in Example 3 | 100 pbw |
| Mixture A | 14.6 pbw |
| Liquidified form of diphenylmethane 4,4'-<br>diisocyanate (Isonate 143L ex Upjohn) | 10.2 pbw |
| Carbon black pigment dispersion | 2 pbw |
| Stannous octoate | 0.02 pbw |
| Mixture A comprised:<br>Ethylene oxide tipped, 2000 mw poly-<br>propylene glycol (Propylan D-2122 ex Lankro) | 100 pbw |
| Ethylene glycol | 6.3 pbw |
| Trimethylol propane | 8.6 pbw |

The product, in the form of a tread strip, was obtained after the mould had been heated to 80° C. for one hour.

EXAMPLE 5

(Method of making a tire with the tread of Example 3)

A tread strip was prepared by the method of Example 3 using the same component materials.

A solution of a triisocyanate in methylene chloride (Desmodur R ex Bayer) was brushed into one side of the tread and allowed to dry. A solution of a zinc oxide containing compounded natural rubber in toluene was then brushed onto the triisocyanate treated surface and also allowed to dry. The tacky side of the tread was then attached around an uncured tire carcass and the composite article placed in a plain-treaded tire mould (i.e. an unpatterned mould). A rubber tube was inserted into the carcass and inflated to a pressure of 3.45 bar in order to make the uncured rubber conform to the internal dimensions of the mould and also to aid bonding of the tread to the carcass. The mould was then placed between the platens of a press and heated to 155° C. for 60 minutes, after which the completed tire was removed from the mould.

As an alternative to binding the particles together by a binder matrix, the particles may be fused together or the material of adjacent particles cross-linked at their points of contact, or the particles bonded by an adhesive or by being embedded in a thermosetting plastics material.

In order to provide comparative performance results, two tires were made as described in Example 2, differing only in that the tread of one tire was formed from coarse particles comprising 1500 parts by weight of granulated rubber of hardnesses 60–70 Shore A and a range of particle sizes up to 0.5 cc to provide a tire hereafter called the "coarse tread" tire, and the tread of the other tire was formed from fine particles comprising 1000 parts by weight of granulated rubber of hardnesses 60–70 Shore A and average particle size graded to 10 B.S. mesh, to provide a tire hereafter called the "fine tread" tire. In both cases, the treads were bonded onto the carcass of a 155SR13 Dunlop SP 4 tire from which the original tread had been removed by buffing. A standard 155SR13 Dunlop SP 4 tire with its original tread was employed in the tests to give equivalent results for a normally-treaded tire with the same carcass structure. All three tires were identically inflated to the normal pressure for a 155SR13 SP 4 tire, i.e. 1.8 kg/cm$^2$ ("SP 4" is a Registered Trade Mark).

Braking and cornering tests were carried out on an indoor drum-type tire testing machine, suitably instrumented for force measurement, and with facilities for supplying a controlled rate of water flow onto the drum's test surface in order to simulate a road covered with a predetermined depth of water.

Graphs of braking force coefficient against percentage slip for the coarse tread tire, the fine tread tire, and the standard tread SP 4 tire are shown in FIGS. 3 and 4, respectively for equivalent vehicle speeds of 48 km/hour and 80 km/hour. In both cases, water flow rate was 7.5 liters/second, simulating a road flooded by rain to an approximate depth of 3 mm at 48 km/hour and 1 mm at 80 km/hour. FIG. 3 indicates that both porous tread tires have a maximum braking force coefficient approximately three times that of the standard-tread SP 4 at 48 km/hour in very wet conditions, with the coarse tread tire performing somewhat better than the fine tread tire.

FIG. 4 shows that at 80/km/hour, both porous tread tires perform approximately as well in braking as at 48 km/hour in the same water depth, but now approximately eight times better than the braking performance of the standard tread tire.

FIGS. 3 and 4 show clearly that wet-road braking performance of tires in accordance with the invention is substantially better than that of an otherwise identical tire, but which has a conventionally patterned tread of surface grooves. The numerous randomly interconnected and randomly oriented passages in the tread of the present invention provide for a ready escape of water from between the road surface and the portion of the tread in contact therewith and into the bulk of the porous tread so preventing any excessive build-up of water in the contact patch which would otherwise reduce effective contact with the road and hence reduce braking performance. The water thus taken into the bulk of the tread can escape laterally through the edges of the tread and also radially out through the surface of the tread under centrifugal force as it leaves contact with the road upon continued rotation along the road.

Graphs of variations in available cornering force with variation in speed are shown in FIG. 5 and 6 for the same three tires whose braking performance were illustrated in FIGS. 3 and 4. In FIG. 5, the water flow was 7.5 liter/second, while in FIG. 6, the water flow was reduced to 1.0 liter/second. Both FIGS. 5 and 6 indicate that all three tires had comparable cornering abilities at low speed (16 km/hour and less), but that the porous tread tires suffered little diminution with substantially increased speed (up to 100 km/hour) whereas the conventionally treaded tire suffered a drastic loss of cornering ability at these increased speeds, more so on the wetter surface (FIG. 5). In general, the wet road cornering ability of the fine tread tire was marginally better than that of the coarse tread tire.

Further comparative tests on the three tires compared in FIGS. 3-6 were undertaken to demonstrate noise generating properties of the respective treads. Generated sound pressure levels at speeds of 50 km/hour and 80 km/hour are tabulated below for the three tires.

| Tire | 50 km/hour | 80 km/hour |
| --- | --- | --- |
| Standard tread Sp 4 | 82.5 dB(A) | 88.0 dB(A) |
| Fine tread tire | 76.0 dB(A) | 85.0 dB(A) |
| Coarse tread tire | 79.0 dB(A) | 85.5 dB(A) |

Thus tires in accordance with the invention are quieter in use than an equivalent conventionally-treaded tire.

Tires in accordance with the invention were also found to have improved grip on icy surfaces than equivalent conventionally-treaded tires.

Thus the present invention provides tire treads and tires with such treads that have a markedly superior wet-grip capability and reduce noise generation, and moreover which obviate the requirement for the usual intricately patterned and highly expensive tread pattern-forming mould.

Having now described our invention—what we claim is:

1. A method of manufacturing a tire tread having an assembly of numerous discrete particles of vulcanized elastomeric material bonded together to form a cohesive non-solid mass with adjacent particles bonded together only at separated portions thereof, and intermediate said bonded portions, the particles being spaced-apart to provide passages which are randomly distributed and randomly orientated, said passages extending substantially throughout the tread, including from a highway-contacting surface of the tread, said passages constituting voids in the tread, the total void content of the tread being in the range from 10% to 60% of the overall volume of the tread, said method comprising the steps of mixing prevulcanized particulated elastomeric material with a binder, shaping said mixture to the required shape of the tread and curing the binder so that voids are left in the finished tread.

2. A method according to claim 1, wherein said particles have a volumetric size of at least $5 \times 10^{-4}$ cc.

3. A method according to claim 2, wherein said particles have a volumetric size or sizes in the range from $5 \times 10^{-4}$ cc to $4 \times 10^{-2}$ cc.

4. A method according to claim 1, wherein said particles are of granulated rubber of hardness in the range 60-70 Shore A, of irregular shapes and sizes up to 0.5 cc.

5. A method according to claim 1, wherein said particles are of granulated rubber of hardnesses in the range 60-70 Shore A, of irregular shapes and with an average particle size graded to 10 B.S. mesh.

6. A method according to claim 1 in which the particles are irregularly shaped.

7. A method according to claim 1 including the further step of extruding the mixture through a die whose orifice is shaped to the required cross-sectional shape of the tread.

8. A method according to claim 7 including the further step of at least partly curing the binder immediately after it leaves the die.

9. A method according to claim 7 including the further step of severing the extruded tread into discrete lengths substantially equal to the circumference of tires into which the tread lengths of tread are to be incorporated.

10. A method according to claim 1 wherein the shaping process is performed by the step of placing the mixture in a mould having the shape and dimensions of a desired strip of tread, followed by the steps of at least partly curing the binder in said mould, and finally removing the tread strip from the mould.

11. A method according to claim 10 wherein the mould is annular whereby said steps produce a tread band in the form of a jointless loop of tread.

12. A method of manufacturing a pneumatic tire comprising the steps of forming the tire tread according to claim 1, applying the tire tread to a tire carcass, and consolidating the assembly of the tread and the carcass.

13. A method according to claim 12 wherein the steps of forming and applying the tire tread to the tire carcass are performed by extruding the tread onto the carcass, and the step of consolidating the assembly is performed by placing the assembly in a mould and then applying heat and pressure to cure the assembly in the mould, followed by the further step of removing the tire from the mould when the tire is substantially completely cured.

14. A method according to claim 12 wherein the steps of forming and applying the tire tread to the tire carcass are performed by placing the carcass in a mould, injecting a mixture of elastomeric particles and a binder material into the mould around the carcass, and the step of consolidation is performed by applying heat and pressure to cure the assembly of the carcass and the tread materials within the mould, followed by the further step of removing the tire from the mould when the tire is substantially completely cured.

15. A method according to claim 12 comprising the steps of preforming the tread as a tread strip or a tread band, and bonding the preformed tread onto the tire carcass.

16. A method according to claim 15 wherein the tread is bonded onto the carcass by use of an adhesive.

17. A method according to claim 15 including the further step of curing the tire carcass and the tire tread bonded thereto in an unpatterned mould by the application of heat and pressure.

* * * * *